United States Patent
Rikhof

(10) Patent No.: US 7,195,315 B2
(45) Date of Patent: Mar. 27, 2007

(54) DEVICE FOR TIGHTENING A SEAT BELT

(75) Inventor: Johannes Hendrikus Rikhof, Beuningen (NL)

(73) Assignee: HTS Han Torgersen & Sønn AS, Krøderen (NO)

( * ) Notice: Subject to any disclaimer, the term of this patent is extended or adjusted under 35 U.S.C. 154(b) by 130 days.

(21) Appl. No.: 10/518,765

(22) PCT Filed: Jul. 2, 2003

(86) PCT No.: PCT/NO03/00231

§ 371 (c)(1),
(2), (4) Date: Jan. 25, 2005

(87) PCT Pub. No.: WO2004/033251

PCT Pub. Date: Apr. 22, 2004

(65) Prior Publication Data

US 2006/0175890 A1    Aug. 10, 2006

(30) Foreign Application Priority Data

Jul. 4, 2002    (NO) .................................. 20023255

(51) Int. Cl.
*A47D 1/10* (2006.01)
*A47D 15/00* (2006.01)
*A62B 35/00* (2006.01)
*B60R 21/00* (2006.01)
*B60R 22/00* (2006.01)

(52) U.S. Cl. .............................. 297/256.16; 297/250.1; 297/468; 297/476; 297/479

(58) Field of Classification Search ........... 297/256.16, 297/250.1, 468, 476, 479
See application file for complete search history.

(56) References Cited

U.S. PATENT DOCUMENTS 4,913,490 A * 4/1990 Takahashi et al. ..... 297/256.14

(Continued)

FOREIGN PATENT DOCUMENTS

EP        1077152        2/2001

(Continued)

*Primary Examiner*—Rodney B. White
(74) *Attorney, Agent, or Firm*—Christian D. Abel

(57) ABSTRACT

A device for tightening a seat belt (1) such as, for example, a three-point seat belt comprising a lap belt part (2) and a diagonal belt part (3), where the seat belt is used to fix a child car seat in a passenger seat. A portion of the seat belt preferably the lap belt part (2) is arranged in connection with the child car seat's lower portion (4). The device is characterised in that the lower portion (4) is designed with an abutment portion (4a) for placing a portion of the seat belt, preferably the lap belt part (2). Furthermore, a tightening unit (5) is rotatably mounted in at least one mounting point (6) in connection with the child car seat's lower portion (4). The lap belt part (2) is arranged in such manner that it abuts against portions of the abutment portion (4a) and the tightening unit (5) when the tightening unit (5) is located in an initial position. The tightening unit (5) is brought into a tightening position by rotating the tightening unit (5) about the mounting point (6), thus causing the distance between portions of the lap belt part (2) and the child car seat's lower portion (4) to increase, while contact is maintained between portions of the lap belt part (2) and the tightening unit (5). A tightening is thereby obtained of the lap belt part (2) and the child car seat is thereby pressed further in towards the passenger seat.

8 Claims, 4 Drawing Sheets

U.S. PATENT DOCUMENTS

| | | | |
|---|---|---|---|
| 5,031,962 A * | 7/1991 | Lee | 297/479 X |
| 5,160,186 A * | 11/1992 | Lee | 297/479 |
| 5,277,472 A * | 1/1994 | Freese et al. | 297/256.16 X |
| 5,611,596 A * | 3/1997 | Barley et al. | 297/256.13 |
| 5,839,789 A * | 11/1998 | Koledin | 297/476 |
| 5,915,787 A * | 6/1999 | Brookman | 297/256.16 X |
| 5,979,982 A | 11/1999 | Nakagawa | |
| 6,017,087 A * | 1/2000 | Anthony et al. | 297/256.16 X |
| 6,152,528 A * | 11/2000 | van Montfort | 297/250.1 |
| 6,220,662 B1 * | 4/2001 | Franco-Vila et al. | 297/256.16 X |
| 6,237,999 B1 * | 5/2001 | Hobson | 297/256.16 X |
| 6,247,208 B1 | 6/2001 | Creech | |
| 6,318,799 B1 * | 11/2001 | Greger et al. | 297/256.16 X |
| 6,428,100 B1 * | 8/2002 | Kain et al. | 297/256.16 X |
| 6,447,060 B1 * | 9/2002 | Vila et al. | 297/256.16 X |
| 6,508,510 B2 * | 1/2003 | Yamazaki | 297/250.1 |
| 6,554,358 B2 * | 4/2003 | Kain | 297/256.16 X |
| 6,672,664 B2 * | 1/2004 | Yanaka et al. | 297/256.16 |
| 6,779,842 B2 * | 8/2004 | McNeff | 297/250.1 |
| 7,059,676 B2 * | 6/2006 | McNeff | 297/250.1 |

FOREIGN PATENT DOCUMENTS

| | | |
|---|---|---|
| EP | 1110806 | 6/2001 |
| FR | 2829448 | 3/2003 |
| WO | WO 03/008226 | 1/2003 |

* cited by examiner

DEVICE FOR TIGHTENING A SEAT BELT

The present invention relates to a device for tightening a seat belt.

The seat belt should be used for fixing a child car seat to a passenger seat. In a preferred embodiment of the invention a three-point seat belt is used comprising a lap belt part and a diagonal belt part for attachment of the child car seat. The device according to the invention will be particularly useful in connection with a method of attachment where the diagonal belt part is arranged in connection with the child car seat's back support, while the lap belt part is arranged in connection with the child car seat's lower portion, for example below the sitting portion or in connection with the child car seat's base, if the child car seat is designed with such a structure. The term base here refers to a structure with a bottom that rests against the passenger seat's sitting portion, where the base supports the child car seat's remaining structures such as the back structure and sitting structure. The base will often be cast and will be suitably provided with shapes that can be used for receiving, taking up and adjustments of the lap belt part. In this respect it will be obvious to a person skilled in the art that other types of seat belts that a three-point seat belt may also be employed for attaching the child car seat's lower portion, the crucial characteristic of the seat belt in question being that a portion of the seat belt can be positioned over a lower portion of the child car seat.

It is an object of the present invention that the lower portion of the child car seat should be fixed to the passenger seat in a manner that ensures that the child car seat is held as tightly as possible and preferably pressed in against the passenger seat. It is, of course, not sufficient to attach the child car seat merely by securing the lower portion of the child car seat to the passenger seat, and there will therefore also be a need to attach the child car seat's upper portion. According to the invention the focus of the patent application is attachment of the child car seat's lower portion, while the attachment of the child car seat's upper portion will thus be discussed here in very general terms. Attachment of the child car seat's upper portion may be implemented in various ways, and special mention will be given here to a system for an especially advantageous attachment of the child car seat's upper portion by employing a portion of a three-point seat belt. This system ensures that the child car seat's upper portion is held close into the passenger seat, and will function in a particularly advantageous fashion together with the device according to the invention. This system for attaching the child car seat's upper portion is described, for example, in NO 20013564.

At the present time there are several types of devices for positioning a seat belt at the child car seat's lower portion. We refer in this connection to U.S. Pat. No. 5,979,982 in which a mechanism is disclosed that is employed for tightening a seat belt, where the mechanism consists of several parts and is relatively complicated to assemble.

We further refer to U.S. Pat. No. 6,247,208 wherein a U-shaped tightening mechanism is disclosed where a portion of the seat belt is wound around one of the arms of the U and the other arm of the U can be locked relative to the base.

The device according to the invention is substantially different from these known mechanisms in that it has a simpler construction and is easier to use. In addition, according to the invention the tightening function that already exists in self-tightening three-point seat belts is improved, thus achieving a tension from the lap belt part that ensures that the lower portion of the child car seat is pressed to an optimum extent in towards the passenger seat. By means of the device according to the invention, particularly when used together with the system for attaching an upper portion of the child car seat as described above, an attachment of the child car seat is obtained which from the point of view of safety will be highly advantageous compared to existing solutions.

The device according to the invention functions best when a three-point seat belt is employed, in which case the lap belt part is arranged in connection with the child car seat's lower portion or possibly a base if the child car seat is designed with this. The child car seat's lower portion/base is designed with an abutment portion for placing the lap belt part. Furthermore, the child car seat's lower portion/base is arranged with a tightening unit which is rotatably mounted in at least one mounting point. When the child car seat is fastened to the passenger seat, the lap belt part is arranged in such a manner that it rests against portions of the abutment portion and the tightening unit respectively. The tightening portion is then located in a initial position. From this initial position the tightening unit can be rotated about the mounting point and brought into a tightening position where portions of the lap belt part are moved away from the abutment portion, thus increasing the distance between the lap belt part and the child car seat's lower portion/base. During the tightening unit's rotational movement, contact is maintained between a portion of the lap belt part and the tightening unit. When the tightening unit is brought into a tightening position, a tightening of the lap belt part is achieved that results in the child car seat being pressed further in towards the passenger seat.

Where the child car seat has a base, it may be designed with a raised portion possibly with sides. The raised portion and/or the sides may have a height that at least corresponds to the width of the lap belt part. Portions of the raised portion's sides may form the abutment portion for the lap belt part.

The tightening unit is preferably composed of a three-dimensional structure, where in an embodiment the height of the tightening unit corresponds to the height of the raised portion. In an embodiment the tightening unit has a uniform cross section in the height direction, and this cross section may be oval-shaped, triangular with rounded corners, wedge-shaped with rounded corners, drop-shaped, etc.

Furthermore, the tightening unit may be eccentrically mounted in connection with the child car seat's lower portion/base by the tightening unit's mounting point being located at a distance from the tightening unit's central point.

In an embodiment the tightening unit may be located in a recess in the abutment portion, where the recess may be of a shape substantially corresponding to portions of the tightening unit's sides in the tightening unit's height direction. Where the abutment portion is composed of the raised portion's sides, and the tightening unit is located in the recess described above, portions of the tightening unit's lateral surface may be oriented on a level with the abutment portion.

The tightening unit may be moved from a initial position where the tightening unit does not cause tension in the lap belt part to a maximum tightening position where the tightening unit causes maximum tension in the lap belt part. The angle of rotation between the initial position and maximum tightening position will be approximately 90°. It is not necessary in all embodiments of the invention for the tightening unit to be moved to the maximum tightening position (90°). The extent to which the tightening unit is rotated in the individual embodiment can vary according to how much "slack" there is in the seat belt, the design of the tightening unit, etc.

When rotating the tightening unit from initial position to tightening position, the lap belt part is moved into abutment with portions of the tightening unit's sides, along the tightening unit's circumference. When the tightening unit has been moved to a tightening position and portions of the lap belt part are moved out of the abutment portion, the lap belt part will be in contact with a portion of the tightening unit, which, as viewed in the tightening unit's cross section, is located furthest away from the tightening unit's mounting point.

A lever, handle or other suitable rigid connection may be connected to the tightening unit, thus enabling the tightening unit to be moved between a initial position and a tightening position by moving the handle or by a movement of the hand.

The invention will now be described with reference to the figures.

Figure 1:
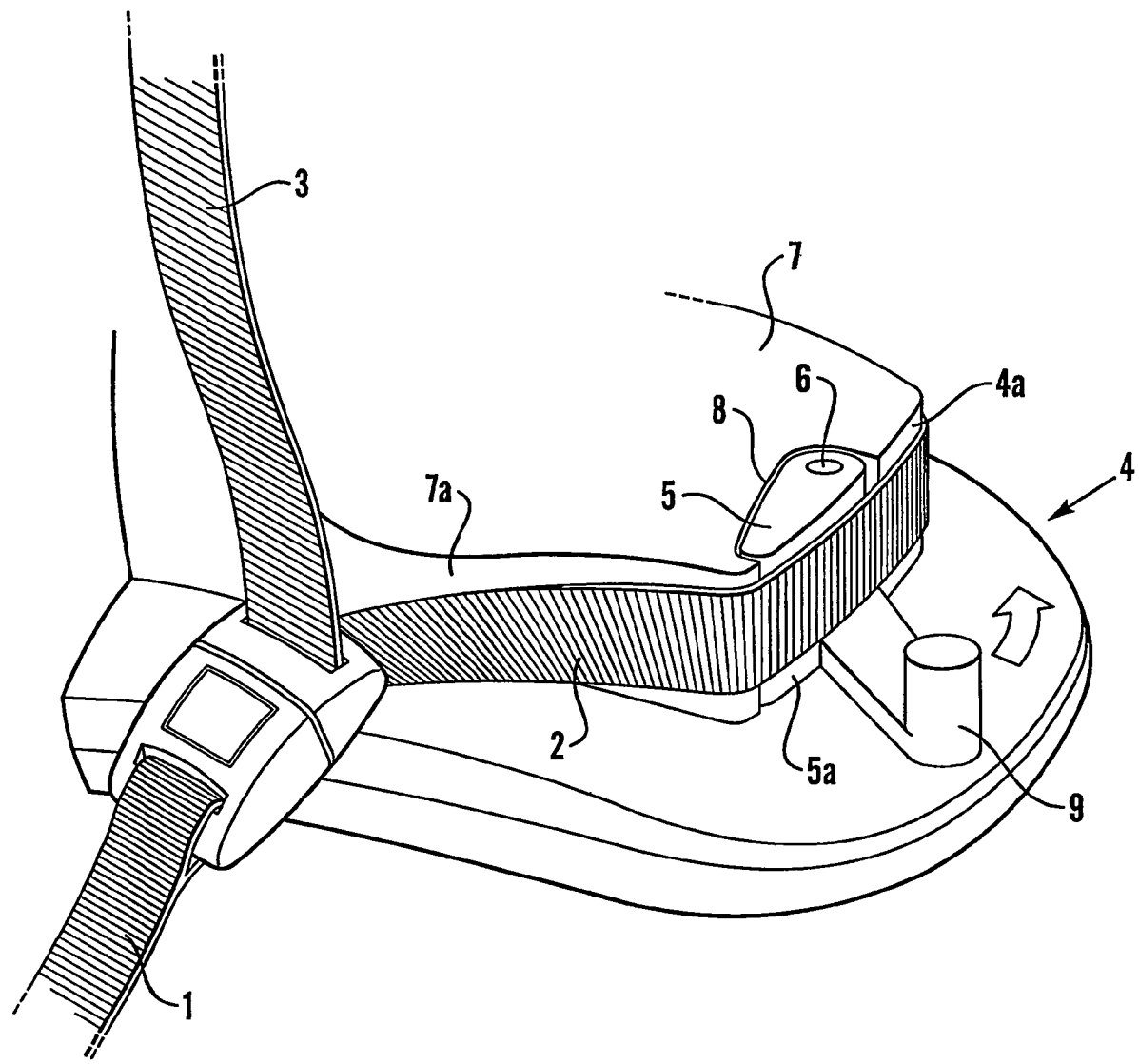
FIG. 1 illustrates an embodiment of the invention where the tightening unit is in a initial position.

In FIG. 1 the child car seat's lower portion is illustrated as a base 4, where the lap belt part 2 of a three-point seat belt 1 has to abut against/be arranged around the base 4. The base is designed with a raised portion 7 which has sides 7a. The sides 7a have portions that are suitable as an abutment portion 4a for the lap belt part 2, since the height of the sides 7a at least corresponds to the width of the lap belt part 2. In the abutment portion 4a/the sides 7a there is provided a recess 8 where a tightening unit 5 is rotatably mounted about a mounting point 6, which is eccentrically located relative to the tightening unit's central point. In the embodiment illustrated in FIG. 1 the recess 8 has a shape corresponding to portions of the tightening unit's sides 5a, and in addition other portions of the tightening unit's sides 5a are oriented on a level with the abutment portion 4a. The tightening unit 5 is illustrated with a cross section which is triangular in shape with rounded corners. The lap belt part 2 is arranged as illustrated in FIG. 1 in such a manner that it abuts against portions of the tightening unit's sides 5a and against the abutment portion 4a.

In FIG. 1 it is further illustrated that the tightening unit 5 is connected to a handle 9, which is rigidly connected to the tightening unit 5. By moving this handle 9, the tightening unit 5 is moved by rotation from the initial position illustrated in FIG. 1 to the tightening position illustrated in FIG. 2.

Figure 2:
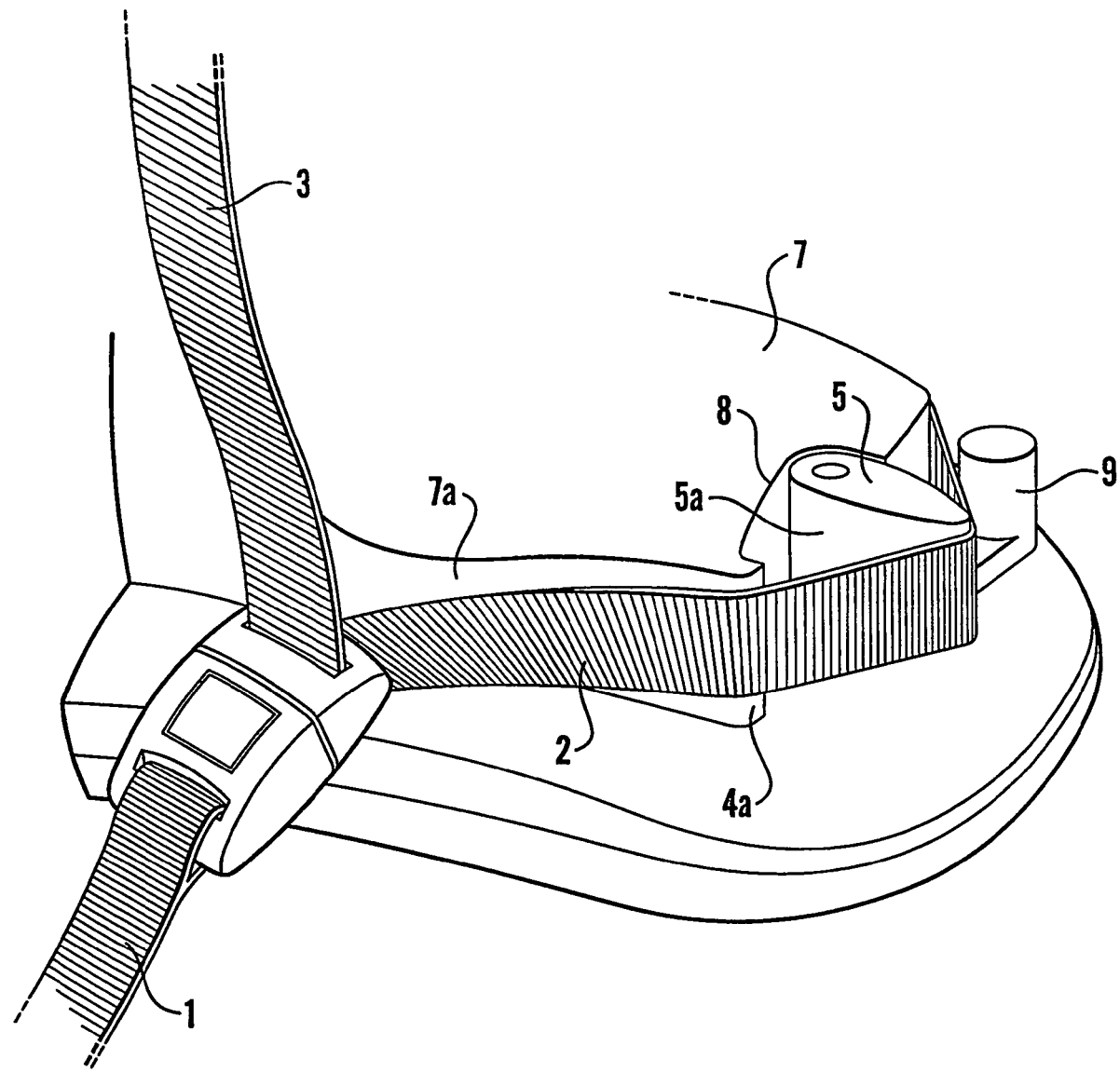
FIG. 2 illustrates an embodiment of the invention where the tightening unit is moved into a tightening position.

In FIG. 2 the tightening unit 5 is illustrated rotated about its mounting point 6, the tightening unit 5 having rotated approximately 90° from its initial position. By means of this rotating movement of the tightening unit 5, the lap belt part 2 is moved along the circumference of the tightening unit in abutment with portions of the tightening unit's sides 5a. When the tightening unit 5 is moved into the tightening position and portions of the lap belt part 2 are moved out of the abutment portion 4a, the lap belt part will be in contact with a portion of the tightening unit 5, which in this case is a lateral edge of the tightening unit 5 at the opposite end of the tightening unit's mounting point. The portion of the tightening unit with which the tightening unit 5 is now in contact is located in an area of the tightening unit 5 which is furthest away from the tightening unit's mounting point 6, viewed in the tightening unit's 5 cross section. In the position illustrated in FIG. 2 the lap belt part 2 is tightened up and the child car seat is pressed further in towards the passenger seat, thus securing the child car seat tightly against the passenger seat. Naturally it is also possible to move the tightening unit 5 in the opposite direction, from tightening position to initial position, when the lap belt part 2 has to be released from abutment against the base or the lower portion of the child car seat.

Figure 3:
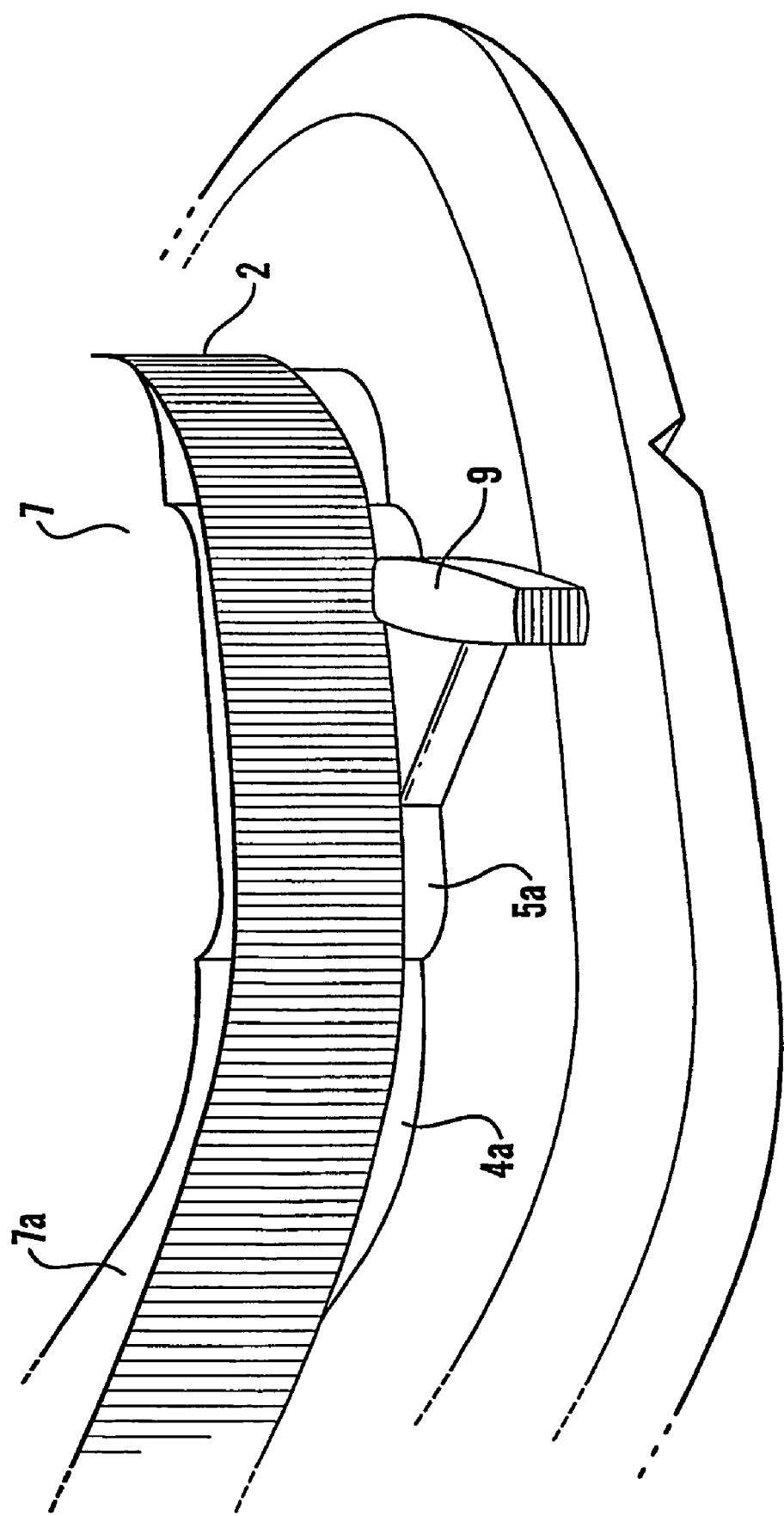
FIG. 3 illustrates the same position as in FIG. 1, but with a second embodiment of the tightening unit.
Figure 4:
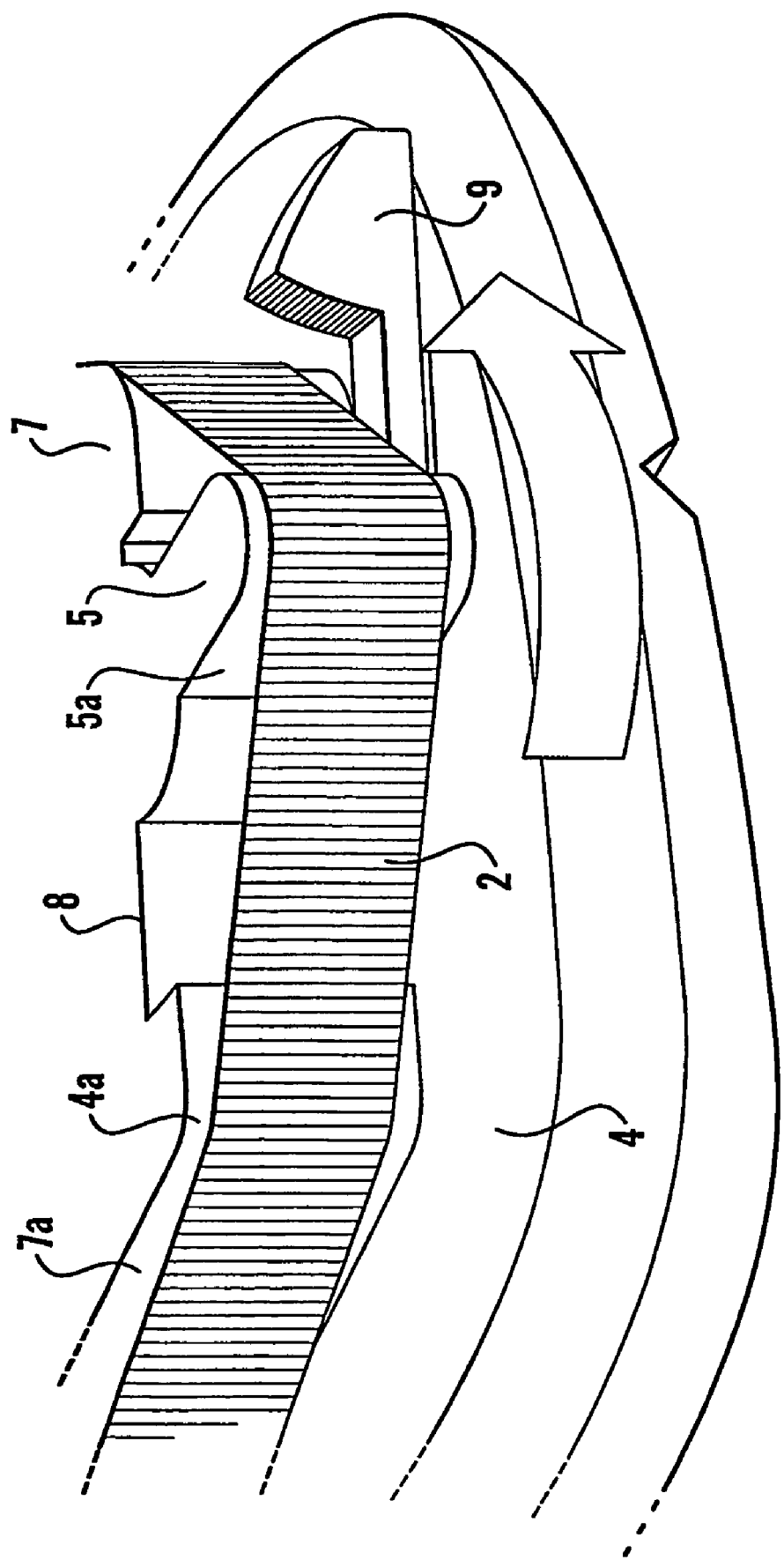
FIG. 4 illustrates the same situation as in FIG. 2, but with a second embodiment of the tightening unit.

In FIGS. 3 and 4 the same situation is illustrated as in FIGS. 1 and 2 respectively, but in this case the tightening unit 5 is illustrated with an oblong, oval cross section.

In designing the tightening unit 5 it will be appreciated that it is important to design the sides 5a in such a fashion that they are as continuous as possible, possibly with rounded lateral edges, thereby avoiding edges that may form an obstacle when the lap belt part 2 has to be moved in abutment along the sides 5a when rotating the tightening unit from a initial position to an extended position.

In the embodiments of the invention illustrated in FIGS. 1-4, the child car seat's lower portion is illustrated as a base 4, where the child car seat's remaining structures can be placed on the base 4. In an embodiment of the invention the child car seat's sitting structure may be placed on the base in such a manner that the child car seat covers the lap belt part 2 and the remaining components, apart from the handle 9 which will be accessible to the user and can easily be moved between a initial position and a tightening position.

The invention claimed is:

1. A child car seat with a seat belt tightening device adapted to tighten a three-point seat belt that is employed for fixing the child seat in a passenger seat, such a seatbelt comprising a lap belt part (2) and a diagonal belt part (3), where the lap belt part (2) is arranged in connection with the child car seat's lower portion (4), wherein the child car seat's lower portion (4) is designed with an abutment portion (4a) facing outward from the child seat's exterior, against which the lap belt part (2) is placed when fixing the child seat, and further wherein a tightening unit (5) is rotatably mounted in at least one mounting point (6) in connection with the child car seat's lower portion (4), such that the lap belt part (2) when initially attached abuts against the outwardly facing abutment portion (4a) and the tightening unit (5) respectively, when the tightening unit (5) is located in an initial position, and whereby the tightening unit (5) may thereafter be brought into a tightening position by rotating the tightening unit (5) about the mounting point (6), whereby a portion of tightening unit (5) presses the lap belt part (2) away from the abutment portion (4a) thereby increasing the distance between portions of the lap belt part (2) and the child car seat's lower portion (4), while at the same time contact is maintained between portions of the lap belt part (2) and the tightening unit (5), so that a tightening is obtained of the lap belt part (2), and that the child car seat thereby is pressed further in towards the passenger seat.

2. Child car seat with a seat belt tightening device according to claim 1, wherein the child car seat's lower portion (4) is composed of a base that supports the child car seat's remaining seat structure, the base being designed with a raised portion (7) with sides (7a) which have a height that at least corresponds to the width of the lap belt part (2), where portions of the sides (7a) form the abutment portion (4a).

3. Child car seat with a seat belt tightening device according to claim 2,
wherein the tightening unit (5) is composed of a three-dimensional structure, the three-dimensional structure possibly having a height corresponding to the height of the raised portion's sides (7a), and the tightening unit (5) possibly having a uniform cross section in the height direction.

4. Child car seat with a seat belt tightening device according to claim 1,
wherein the tightening unit (5) is eccentrically mounted, the tightening unit's mounting point (6) being located at a distance from the tightening unit's central point.

5. Child car seat with a seat belt tightening device according to claim 1,
wherein the abutment portion (4a) is designed with a recess (8) for placing the tightening unit (5), where the recess (8) may have a shape substantially corresponding to portions of the tightening unit's sides (5a), and where other portions of the tightening unit's sides are located on a level with the abutment portion (4a).

6. Child car seat with a seat belt tightening device according to claims 1,
wherein a lever or a handle (9) is connected with the tightening unit (5), thus enabling the tightening unit (5) to be moved between a initial position and a tightening position by moving the handle or lever (9).

7. Child car seat with a seat belt tightening device according to claim 1,
wherein the tightening unit (5) has an angle of rotation of approximately 90°.

8. Child car seat with a seat belt tightening device according to claim 1,
wherein by rotating the tightening unit (5) from initial position to tightening position, the lap belt part is moved along portions of the tightening unit's circumference in abutment with the tightening unit's sides (5a), with the result that in the tightening position the lap belt part abuts against a portion of the tightening unit (5), which, viewed in the tightening unit's cross section, is located furthest away from the mounting point (6).

* * * * *